Figure 1:
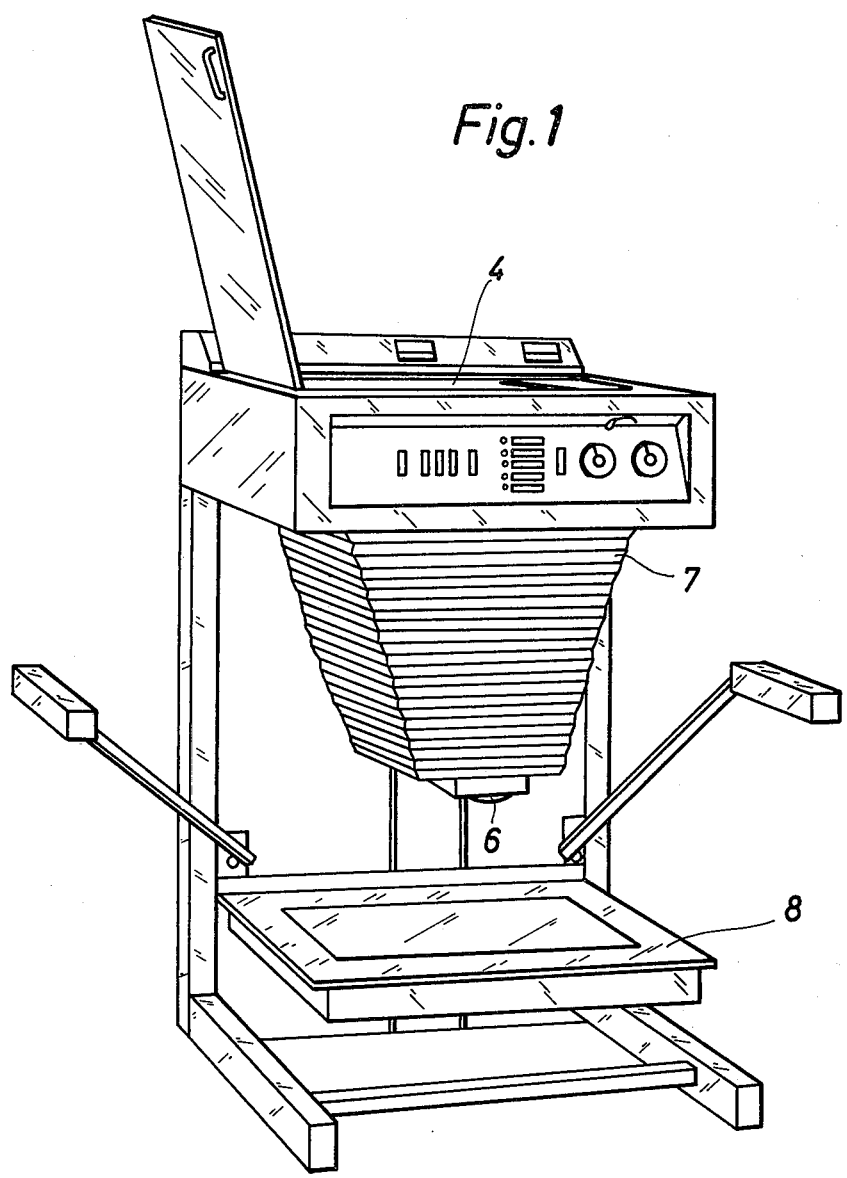

United States Patent [19]

Nygaard

[11] 4,313,676
[45] Feb. 2, 1982

[54] METHOD OF AUTOMATICALLY ADJUSTING A PICTURE REPRODUCING APPARATUS

[75] Inventor: Sven Nygaard, Trekanten, Denmark

[73] Assignee: Eskofot, A/S, Ballerup, Denmark

[21] Appl. No.: 107,381

[22] Filed: Dec. 26, 1979

[30] Foreign Application Priority Data

Jan. 11, 1979 [DK] Denmark .............................. 117/79

[51] Int. Cl.³ ...................... G03B 27/34; G03B 27/40
[52] U.S. Cl. ........................................ 355/56; 354/25; 355/77
[58] Field of Search ...................... 354/25; 355/55–60, 355/77

[56] References Cited

U.S. PATENT DOCUMENTS

| | | |
|---|---|---|
| 3,625,607 | 12/1971 | Bravenec .............................. 355/56 |
| 3,634,008 | 1/1972 | Plummer et al. ...................... 355/56 |
| 3,735,686 | 5/1973 | Brewer et al. ....................... 355/56 X |
| 3,779,642 | 12/1973 | Ogawa et al. ....................... 355/56 X |
| 3,832,058 | 8/1974 | Gusovius ............................. 355/56 |
| 4,021,115 | 5/1977 | Jeppesen ............................. 355/56 |

*Primary Examiner*—Richard A. Wintercorn
*Attorney, Agent, or Firm*—Michael Ebert

[57] ABSTRACT

A method of adjusting a picture reproducing apparatus such as for instance a camera, which comprises an original plane, an objective plane, and a picture plane, by means of driving means in the form of direct-current motors. The motors are controlled by means of voltage pulses, each motor being stopped after each supply of pulses, and the width of the pulses being regulated in response to the voltage across the motor in question. The direct-current motor thereby replaces a stepping motor.

4 Claims, 4 Drawing Figures

METHOD OF AUTOMATICALLY ADJUSTING A PICTURE REPRODUCING APPARATUS

The invention relates to a method of adjusting a picture reproducing apparatus such as for instance a camera, which comprises an original plane, an objective plane, and a picture plane, by means of one or more driving means in the form of a plurality of direct-current motors with a high starting moment.

It is known to regulate a band feeding by means of a direct-current motor, which initially runs quickly and subsequently slowly to obtain an accurate final angular position, cf. e.g. German Offenlegungsschrift No. 2,151,383. This motor has, however, the draw-back that it must be relatively large so as to meet the requirements as to drawing current at the low velocities in order to obtain a sufficient torque.

The exact angular position may also be provided by means of a stepping motor, which, however, is much more costly. Furthermore, the stepping motor is rather noisy and requires a rather complicated control system comprising a high number of supply lines.

The object of the invention is to provide a manner of achieving the desired angular accuracy by means of a direct-current motor with a high torque.

The method according to the invention is characterized by the direct-current motors being controlled by voltage pulses, the individual motor being stopped after each supply of pulses, and by the width of the pulses being regulated in response to the voltage across the motor. As a result, the direct-current motor substantially functions as a stepping motor as a consequence of the pulse-shaped current supply, and an exact final angular position is obtained. The voltage pulses provide relatively high starting moments without increasing the average current supplied. In this manner the dimensions of the direct-current motor may be reduced.

The current supply for the motors is dimensioned with an inner resistance permitting a registration of an increasing load as a decreasing voltage across the motors.

According to the invention it is preferred that the pulse width increases with a decreasing voltage across the motor. As a result, a compensation for the circumstance that the motor may be more or less loaded, is provided. Furthermore, a compensation for variations in the voltage of the mains is provided.

Finally, according to the invention the stopping after each supply of pulses may be performed by short-circuiting the windings of the motor. In this manner post rotations are avoided, whereby the angular position is more accurate.

Figure 2:
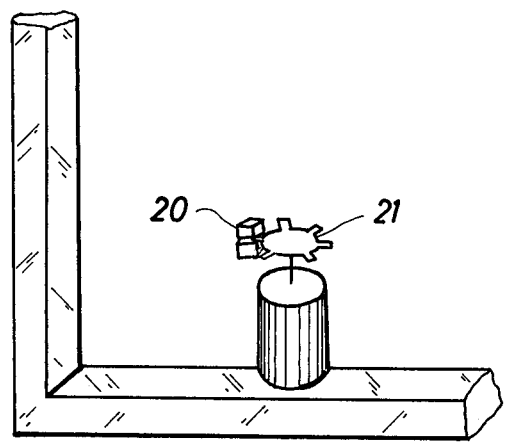
Figure 3:
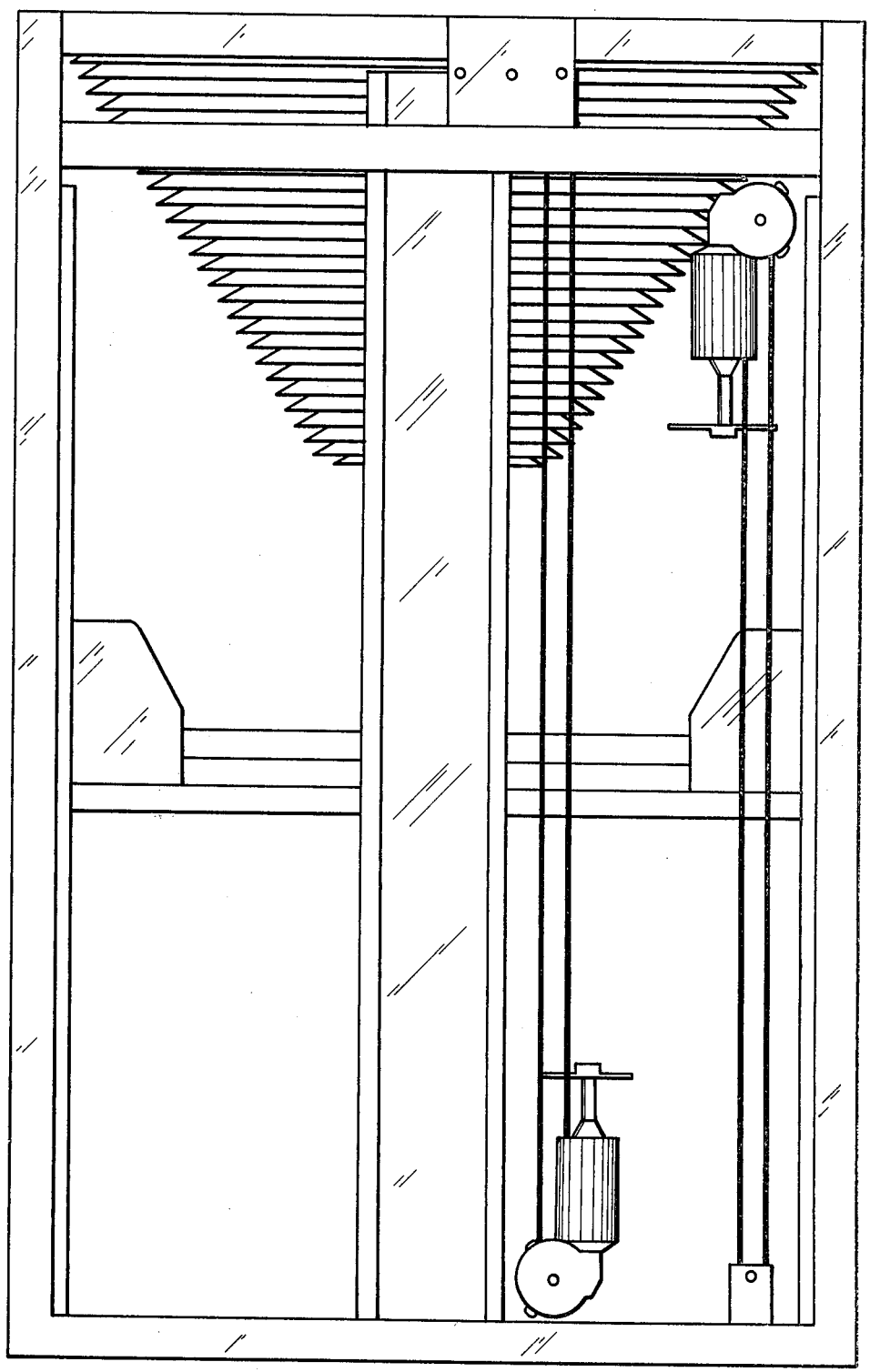
Figure 4:
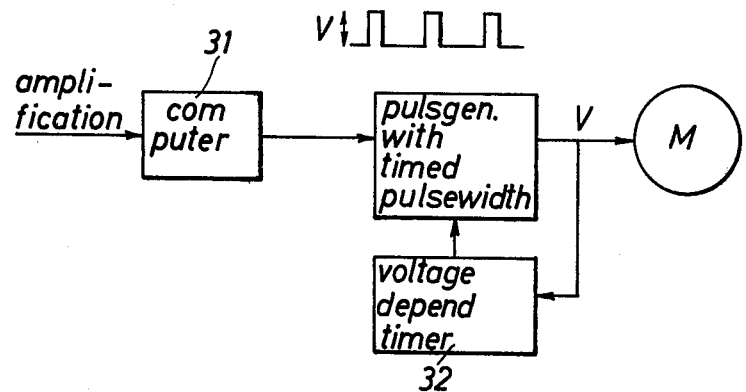

The invention will be described below with reference to the accompanying drawing, in which FIG. 1 illustrates a picture reproducing apparatus in the form of a camera, FIG. 2 is a rear view of a portion of the camera, FIG. 3 is a rear view of the camera including motors and chain drives, and FIG. 4 is a diagrammatic view of a circuit controlling the pulse width.

The camera illustrated in FIG. 1 comprises an original plane 8, an objective plane 6, and a picture plane 4. The planes are adjusted relative to each other by means of a plurality of direct-current motors, cf. FIG. 2, which through the chain drives control the up- and downward movements of the planes. The adjustment is automatically performed. Furthermore, this adjustment is relatively quickly performed without involving an inaccurate final position. In practice, this adjustment is performed by introducing the desired magnifying percent, which determines the position of the planes. Subsequently, the motor locates at a relatively high velocity the plane in question, e.g. the objective plane, adjacent the desired final position, which is carried out in a manner known per se. The final adjustment is then performed by supplying approximately 50 pulses. A quick stopping occurs after each supply of pulses in order to avoid post rotations. In this manner, a controlled positioning is obtained. As a bellow 7 is pressed more and more together during the adjustment of the objective plane 6, cf. FIG. 1, the necessary torque of the motor increases, whereby the motor in question draws more and more current and the voltage across the motor is reduced as a consequence of the inner resistance of the current supply. In order to compensate for this circumstance, the pulse width is changed in response to the voltage across the motor, said pulse width increasing, preferably linearly, with decreasing voltage across the motor. In this manner, compensation for variations in the voltage of the mains is furthermore provided. The voltage supply results from a rectification of the transformed voltage of the mains. The angular position of the motor is simultaneously detected by means of a code disc 21, cf. FIG. 2, in the form of an encoder with photocells 20. The code disc 21 is not per se necessary, but serves as an additional control. For the sake of simplicity, the various chain and screw drives are not illustrated in FIG. 2.

The focussing may have the desired accuracy. The planes in question may for instance be adjusted with an accuracy of 0.06 mm.

The advantage of the pulse supply employed is that the average current intensity thereby is relatively low. The direct-current motor may thereby be correspondingly small. The moment of inertia of the armature and the post rotations are reduced correspondingly.

The method and the apparatus according to the invention may be varied in many ways without deviating from the scope of the invention.

The adjustment to a position adjacent the final position is performed by means of a computer in a manner known per se.

FIG. 4 illustrates a circuit regulating the pulse width. The desired magnification is introduced into a computer 31 determining the positions and the number of pulses to be supplied to the motor M. The voltage V across the motor M is used for controlling a timer 32, which in turn controls the pulse width.

The voltage V multiplied by the pulse width is preferably constant.

I claim:

1. A method of adjusting a picture reproducing apparatus such as for instance a camera, which comprises an original plane, an objective plane, and a picture plane, by means of one or more driving means in the form of a plurality of direct-current motors with a high starting moment, characterized by the direct-current motors being controlled by supplying a series of voltage pulses thereto, the torque required of the motor increasing as the motor approaches a desired position of adjustment, as a consequence of which the voltage across the motor drops, the individual motor being stopped after each supply of pulses, and by the width of the pulses being regulated in response to the voltage across the motor.

2. A method as claimed in claim 1, characterized by the pulse width increasing with the voltage across the motor (M).

3. A method as claimed in claim 1 or 2, characterized by the stopping after each supply of pulses being performed by short-circuiting the windings of the motor (M).

4. In a picture reproducing apparatus such as a camera which includes a direct current motor having a high starting moment coupled to a bellows having an objective mounted thereon, the motor acting to compress the bellows to an extent necessary to axially shift the objective closer to a picture plane so that the objective occupies a desired position, a motor-control circuit comprising:

A a pulse generator to supply a series of drive pulses to the motor to cause the motor to compress the bellows to the desired extent, the torque required of the motor increasing as the objective approaches said desired position, as a consequence of which the voltage across the motor drops;

B voltage-dependent timer means coupled to the pulse generator to vary the width of the pulses supplied to the motor; and C means responsive to the voltage developed across the motor and coupled to said timer to vary the width of the pulses as a function of said motor voltage.

* * * * *